DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 26, 1971

882 O.G. 1347

T882,022

PRINT-OUT SILVER HALIDE MATERIALS

Arthur Fumia, Jr., and Wilbur S. Gaugh, both % Kodak Park Works, Rochester, N.Y. 14650

Filed June 18, 1970, Ser. No. 47,620
**Int. Cl. G03c *1/28***
U.S. Cl. 96—108
No Drawing. 15 Pages Specification

There are disclosed novel radiation-sensitive silver halide materials comprising a halogen acceptor and silver halide crystals formed in an acid media with trivalent metal ions occluded on the inside of said crystals. Typical suitable trivalent metal ions include those of antimony, arsenic, bismuth, gold, iridium, rhodium, and the like. The halogen acceptors disclosed are dithiourazole and dimercaptothiadiazole salts of amines and enamines. Suitable aliphatic amines include ethylamine, isopropylamine, tert-butylamine, ethyl-sec-butylamine, di-isopropylamine, amylamine, hexaylamine, ethylenediamine, tetramethylenediamine, etc., while suitable aromatic amines include aniline, diphenylamine, monomethylaniline, benzylamine, etc. Suitable enamine salts may be prepared from the corresponding secondary amines. Preferred embodiments are those salts having the formulas

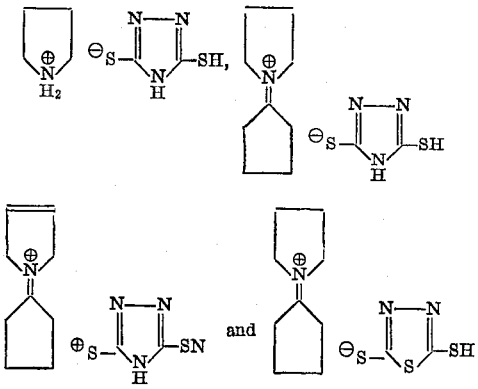

Emulsions containing these compounds are found to have high Dmax and good relative speed.

The sliver halide emulsions and elements described may further contain dispersing agents, coating aids, plasticizers, sensitizing dyes, hardeners, and other suitable addenda such as described in U.S. Pat. 3,447,927 of Bacon et al., issued June 3, 1969 (columns 2–6). Such elements are particularly suitable for the photodevelopment process described in U.S. Pat. 3,418,122 of Colt, issued Dec. 24, 1968.